(12) United States Patent
Nishiyama

(10) Patent No.: US 11,841,782 B2
(45) Date of Patent: Dec. 12, 2023

(54) SEMICONDUCTOR DEVICE AND DEBUGGING SYSTEM

(71) Applicant: Rohm Co., Ltd., Kyoto (JP)

(72) Inventor: Takahiro Nishiyama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 251 days.

(21) Appl. No.: 17/442,868

(22) PCT Filed: Mar. 17, 2020

(86) PCT No.: PCT/JP2020/011756
§ 371 (c)(1),
(2) Date: Sep. 24, 2021

(87) PCT Pub. No.: WO2020/209016
PCT Pub. Date: Oct. 15, 2020

(65) Prior Publication Data
US 2022/0179770 A1    Jun. 9, 2022

(30) Foreign Application Priority Data
Apr. 10, 2019  (JP) ................. 2019-074565

(51) Int. Cl.
*G06F 11/00* (2006.01)
*G06F 11/273* (2006.01)
(Continued)

(52) U.S. Cl.
CPC .......... *G06F 11/2736* (2013.01); *G06F 3/061* (2013.01); *G06F 3/0655* (2013.01);
(Continued)

(58) Field of Classification Search
CPC ................ G06F 11/273; G06F 11/2736
See application file for complete search history.

(56) References Cited

U.S. PATENT DOCUMENTS 6,185,731 B1    2/2001  Maeda et al.
6,651,152 B1    11/2003  Ueki et al.
(Continued)

FOREIGN PATENT DOCUMENTS

| JP | H08286947 | 11/1996 |
|---|---|---|
| JP | 2001056803 | 2/2001 |

(Continued)

OTHER PUBLICATIONS

International Search Report in International Appln. No. PCT/JP2020/011756, dated Jun. 23, 2020, 4 pages.

*Primary Examiner* — Michael Maskulinski
(74) *Attorney, Agent, or Firm* — Fish & Richardson P.C.

(57) ABSTRACT

A semiconductor device includes a data bus, a data memory, a selector, a processor, and a debug controller. The selector is configured to be controlled by the debug controller to be in either a first selecting state in which the processor transmits a first signal to the data bus and a second selecting state in which the debug controller transmits a second signal to the data bus. The debug controller is configured to control the state of the selector based on the reception state of a predetermined command from an external device as well as the states of a read enable signal and a write enable signal from the processor such that, when the selector is in the second selecting state, the debug controller accesses the data bus via the selector.

10 Claims, 9 Drawing Sheets

(51) Int. Cl.
*G06F 3/06* (2006.01)
*G06F 11/36* (2006.01)

(52) U.S. Cl.
CPC .......... *G06F 3/0679* (2013.01); *G06F 11/273* (2013.01); *G06F 11/364* (2013.01)

(56) References Cited

U.S. PATENT DOCUMENTS

| | | | |
|---|---|---|---|
| 6,789,174 B2 * | 9/2004 | Konishi | G06F 13/4243 711/170 |
| 2010/0251022 A1 | 9/2010 | Sato et al. | |
| 2014/0201403 A1 | 7/2014 | Sato et al. | |

FOREIGN PATENT DOCUMENTS

| | | |
|---|---|---|
| JP | 2004086447 | 3/2004 |
| JP | 2010225094 | 10/2010 |
| JP | 5400443 | 1/2014 |

* cited by examiner

READ ACCESS BY CPU, READ OPERATION

READ ACCESS BY DEBUG CONTROLLER, READ OPERATION

WRITE ACCESS BY CPU, WRITE OPERATION

WRITE ACCESS BY DEBUG CONTROLLER, WRITE OPERATION

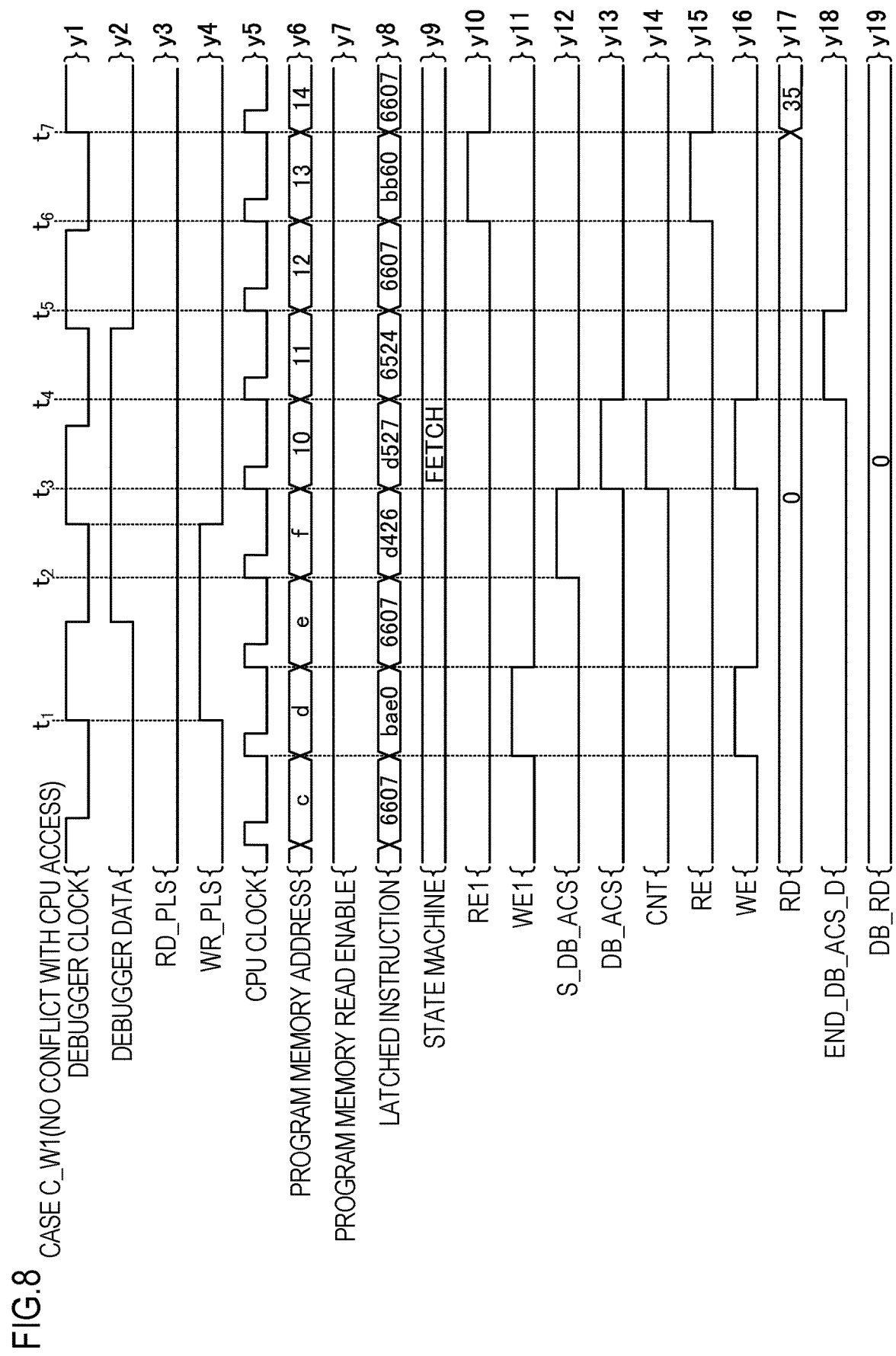

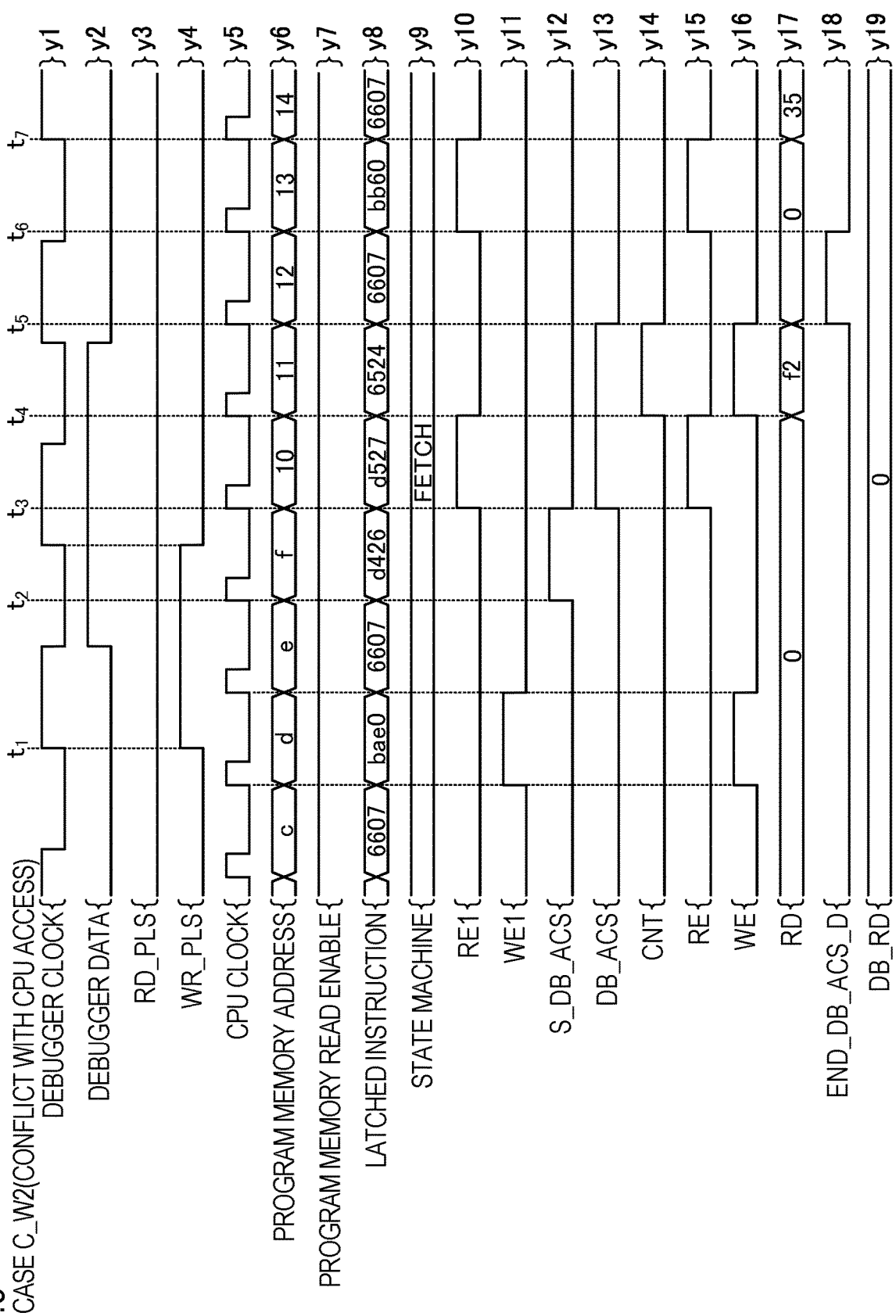

US 11,841,782 B2

SEMICONDUCTOR DEVICE AND DEBUGGING SYSTEM

TECHNICAL FIELD

The present disclosure relates to a semiconductor device and a debugging system.

BACKGROUND ART

In a semiconductor device including a CPU or the like that executes a program, when the program to be executed is developed, a debugging system is often used to support debugging of the program.

It is often desired in debugging to access a data memory in a semiconductor device from outside while a program is running. To meet this demand, many debugging systems have a function by which they can access the data memory from outside the semiconductor device comprising an LSI and the like by serial communication or the like so that they can perform reads and writes as necessary.

Here, an access to the data memory sometimes needs to be performed with the CPU stopped (its program execution broken) momentarily. However, in some devices, stopping the CPU after the start of program execution may cause a problem. For example, in a motor control device, stopping the CPU may lead to inability to control rotation of a motor and this may result in the destruction of the device. Thus, such a device may require a capability to access the data memory periodically without stopping the CPU.

LIST OF CITATIONS

Patent Literature

Patent Document 1: Japanese Patent No. 5400443
Patent Document 2: JP-A-2004-86447

SUMMARY

Problem to be Solved by the Disclosure

A circuit incorporated in a semiconductor device for debugging is not related to the primary operation of the semiconductor device, and thus it is required to have as small a circuit scale as possible; it is also desired to be able to make an access without interfering with the execution of a program.

In some known debugging systems as exemplified by what is disclosed in Patent Documents 1 and 2, a large-scale circuit such as a DMA controller and a bus arbitration circuit is required, and this is not advantageous in terms of cost. Other known debugging systems that require breaking of program execution are difficult to apply to a motor control device, and this and other inconvenience may limit their application. When a conventional debugging system that requires breaking of program execution is used, the breaking can cause the program to behave differently from as intended, and its effect on the operation of the system may make proper debugging impossible.

The present disclosure is aimed at providing a semiconductor device and a debugging system that allow access to a data bus in debugging with a small circuit scale and without affecting program execution.

Means for Solving the Problem

According to one aspect of the present disclosure, a semiconductor device includes a data bus, a data memory configured to be connected to the data bus, a selector configured to be connected to the data bus, a processor configured to execute a program and to be able to access the data bus via the selector, and a debug controller configured to be able to communicate with an external device bidirectionally and to be able to access the data bus via the selector. The selector is configured to be controlled by the debug controller to be in either a first selecting state in which the processor transmits, out of a first signal from the processor and a second signal from the debug controller, the first signal to the data bus, or a second selecting state in which the debug controller transmits, out of the first signal from the processor and the second signal from the debug controller, the second signal to the data bus. Signals output from the processor to the selector include a read enable signal for making the data memory perform a read operation, and a write enable signal for making the data memory perform a write operation, and the debug controller is configured to control a state of the selector based on a reception state of a predetermined command from the external device as well as states of the read enable signal and the write enable signal from the processor such that, when the selector is in the second selecting state, the debug controller accesses the data bus via the selector. (A first configuration.)

In the semiconductor device according to the first configuration described above, preferably, the debug controller is configured such that, when accessing the data bus in response to the predetermined command received, if the read enable signal or the write enable signal is in an asserted state, the debug controller waits until the read enable signal and the write enable signal both turn to a negated state and then switches the selector to the second selecting state to make an access to the data bus in accordance with the predetermined command, and, when accessing the data bus in response to the predetermined command received, if the read enable signal and the write enable signal are both in the negated state, the debug controller, without waiting, switches the selector to the second selecting state to make an access to the data bus in accordance with the predetermined command. (A second configuration.)

In the semiconductor device according to the second configuration described above, preferably, the debug controller has a circuit for generating a data bus access signal that indicates permission of access to the data bus by the debug controller. In response to the predetermined command received, the data bus access signal is turned from the negated state to the asserted state. The debug controller is configured such that, when the data bus access signal is turned from the negated state to the asserted state, if the read enable signal or the write enable signal is in the asserted state, the debug controller waits until the read enable signal and the write enable signal both turn to the negated state and then switches the selector to the second selecting state to make an access to the data bus in accordance with the predetermined command, and, when the data bus access signal is turned from the negated state to the asserted state, if the read enable signal and the write enable signal are both in the negated state, the debug controller, without waiting, switches the selector to the second selecting state to make an access to the data bus in accordance with the predetermined command. (A third configuration.)

In the semiconductor device according to the third configuration described above, preferably, the debug controller is configured such that, when the data bus access signal is in the negated state, the debug controller keeps the selector in the first selecting state, and, after turning the data bus access signal from the negated state to the asserted state in response to the predetermined command received, the debug controller switches the selector to the second selecting state to make an access to the data bus in accordance with the predetermined command, and then turns the data bus access signal from the asserted state back to the negated state and thereby switches the selector back to the first selecting state. (A fourth configuration.)

In the semiconductor device according to any of the first to fourth configurations described above, preferably, the debug controller is configured such that, before the predetermined command is received, the debug controller keeps the selector in the first selecting state, and, after the predetermined command is received, the debug controller switches the selector from the first selecting state to the second selecting state to make an access to the data bus in accordance with the predetermined command, and then switches the selector back to the first selecting state. (A fifth configuration.)

In the semiconductor device according to the first to fifth configurations described above, preferably, the debug controller is configured such that, on receiving a read command as the predetermined command, the debug controller makes a read access to the data bus in accordance with the read command when the selector is in the second selecting state, and the debug controller then transmits, to the external device, read data acquired from the data memory by the read access. (A sixth configuration.)

In the semiconductor device according to the seventh configuration described above, preferably, the data memory has a plurality of storage areas to which a plurality of addresses are assigned, the read command specifies one of the plurality of addresses. The debug controller is configured such that, in the read access in accordance with the read command, the debug controller makes, via the selector, an access to the data bus to acquire from the data memory, as the read data, data in a storage area at an address specified in the read command and transmits the thus acquired read data to the external device. (A seventh configuration.)

In the semiconductor device according to any of the first to fifth configurations described above, preferably, the debug controller is configured such that, when a write command is received as the predetermined command, the debug controller makes a write access to the data bus in accordance with the write command when the selector is in the second selecting state, and, by the write access, data is written to the data memory in accordance with the write command. (An eighth configuration.)

In the semiconductor device according to the eighth configuration described above, preferably, the data memory has a plurality of storage areas to which a plurality of addresses are assigned. The write command specifies one of the plurality of addresses along with write data. The debug controller is configured such that, in the write access in accordance with the write command, the debug controller makes, via the selector, an access to the data bus to write the write data to a storage area at an address specified in the write command. (A ninth configuration.)

According to another aspect of the present disclosure, a debugging system includes a semiconductor device according to any one of first to ninth configurations described above, and an external device configured to be connected to the semiconductor device and to be able to transmit the predetermined command to the debug controller in the semiconductor device. (A tenth configuration.)

Advantageous Effects of the Disclosure

According to the present disclosure, it is possible to provide a semiconductor device and a debugging system that allow access to a data bus in debugging with a small circuit scale and without affecting program execution.

BRIEF DESCRIPTION OF DRAWINGS

FIG. 8 is a diagram related to the first embodiment of the present disclosure, showing one example of a timing chart showing how the LSI responds to a write command received; and FIG. 9 is a diagram related to the first embodiment of the present disclosure, showing another example of a timing chart showing how the LSI responds to a write command received.

DESCRIPTION OF EMBODIMENTS

Hereinafter, examples embodying the present disclosure will be described specifically with reference to the accompanying drawings. Among different diagrams referred to, the same parts are identified by the same reference signs, and in principle no overlapping description will be repeated. In the present description, for the sake of simple description, symbols and reference signs referring to information, signals, physical quantities, elements, and parts are occasionally used with omission or abbreviation of the names of the information, signals, physical quantities, elements, or parts corresponding to those symbols and the reference signs. For example, the read enable signal (see FIG. 1) described later, which is referred to by "RE", is sometimes mentioned as the read enable signal RE and is other times abbreviated to the signal RE, both referring to the same signal.

First Embodiment

Figure 1:
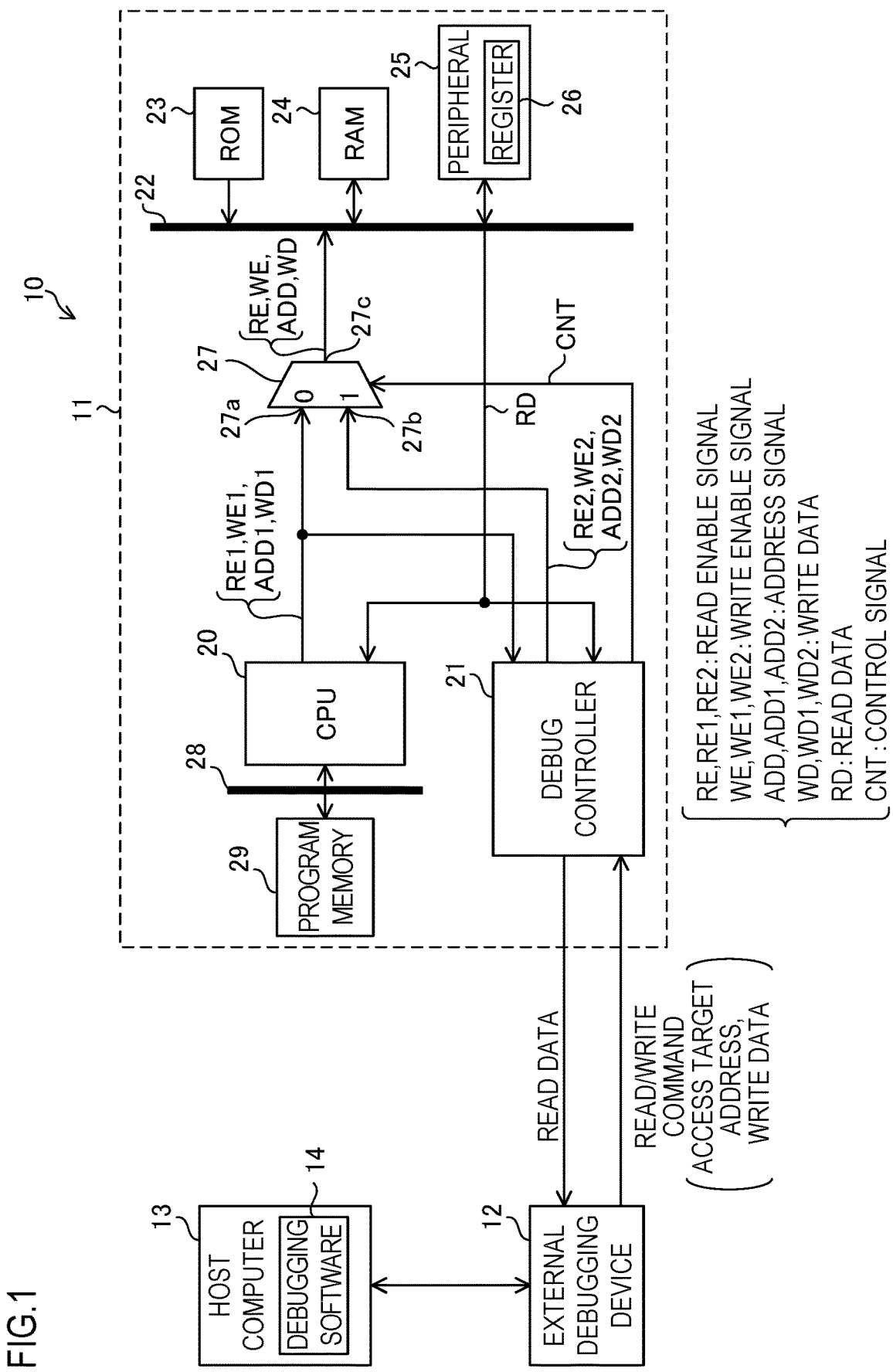
FIG. 1 is a schematic configuration diagram of a debugging system according to a first embodiment of the present disclosure.

A first embodiment of the present disclosure will be described. FIG. 1 is a schematic configuration diagram of a debugging system 10 according to a first embodiment of the present disclosure. The debugging system 10 includes an LSI (large-scale integration) 11 incorporating a CPU (central processing unit), an external debugging device 12, and a host computer 13 (hereinafter occasionally called the host PC 13).

The LSI 11 as a semiconductor device includes a CPU (central processing unit) 20, a debug controller 21, a data bus 22, and a selector 27, along with, as circuit elements connected to the data bus 22, one or more ROMs (read-only memories), one or more RAMs (random-access memories), and one or more peripherals, i.e., peripheral circuits. FIG. 1 shows a ROM 23 as one among the one or more ROMs mentioned above, a RAM 24 as one among the one or more RAMs mentioned above, and a peripheral 25 as one among the one or more peripherals mentioned above. The following description focuses on the ROM 23, the RAM 24, and the peripheral 25 as a ROM, a RAM, and a peripheral. The peripheral 25 incorporates a register 26.

The LSI 11 employs a Harvard architecture. That is, the LSI 11 includes, separately from the data bus 22, a program bus 28, and to the program bus 28 is connected a program memory 29 comprising a flash memory or the like. In the program memory 29, a program to be executed by the CPU 20 is stored. The CPU 20 accesses the program memory 29 via the bus 28. In the following description, what is referred to simply as the program denotes the program stored in the program memory 29.

The program stored in the program memory 29 contains a bundle of instructions (instruction code) to be executed by the CPU 20. The CPU 20 reads, in synchronization with an operation clock for the CPU 20, the needed instructions sequentially from the program memory 29 via the bus 28 and, after decoding or otherwise processing them, executes the read instructions sequentially to continue executing the program.

The external debugging device 12 is connected to the debug controller 21 via an unillustrated terminal provided on the LSI 11 and functions as an interface between the debug controller 21 and the host PC 13. The external debugging device 12 and the host PC 13 are connected together such that they can communicate bidirectionally. On the host PC 13, debugging software 14 is run. A user of the debugging system 10 can, by operating the host PC 13 on which the debugging software 14 is run, perform debugging of the program that is executed by the CPU 20.

Figure 2:
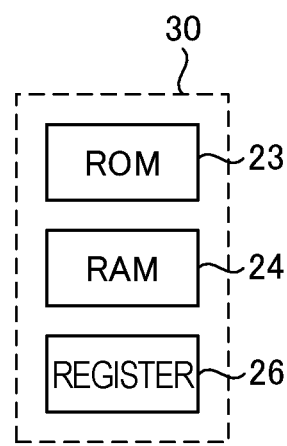
FIG. 2 is a diagram showing a data memory provided in an LSI.

With reference to FIG. 2, in the following description, a memory circuit provided in the LSI 11, i.e., the one that includes the ROM 23, the RAM 24, and the register 26, will be referred to as the data memory 30 for convenience's sake. The data memory 30 includes a large number of storage areas in which data of a predetermined size can be stored. A predetermined address space is defined in the data memory 30, and the storage areas that constitute the data memory 30 are each assigned a unique address. The memory circuit constituting the data memory 30 may include any one or two of the ROM 23, the RAM 24, and the register 26.

The selector 27 includes a first input part 27a, a second input part 27b, and an output part 27c. The first input part 27a is connected to the CPU 20, the second input part 27b is connected to the debug controller 21, and the output part 27c is connected to the data bus 22. This will now be described in detail.

The CPU 20 and the debug controller 21 can each output a read enable signal, a write enable signal, an address signal, and write data. The read enable signal, the write enable signal, the address signal, and the write data that are output from the CPU 20 in particular are referred to as the read enable signal RE1, the write enable signal WE1, the address signal ADD1, and the write data WD1 respectively. The read enable signal, the write enable signal, the address signal, and the write data that are output from the debug controller 21 in particular are referred to as the read enable signal RE2, the write enable signal WE2, the address signal ADD2, and the write data WD2 respectively. Write data can be understood as a signal that conveys write data, and thus, in the following description, the write data WD1 and WD2 are occasionally mentioned as the signal WD1 and WD2 for convenience's sake (the same applies to the write data WD described later).

The first input part 27a is connected to conductors provided between the CPU 20 and the selector 27 for transmission of the signals RE1, WE1, ADD1, and WD1, and receives the signals RE1, WE1, ADD1, and WD1 from the CPU 20. The second input part 27b is connected to conductors provided between the debug controller 21 and the selector 27 for transmission of the signals RE2, WE2, ADD2, and WD2, and receives the signals RE2, WE2, ADD2, and WD2 from the debug controller 21.

The selector 27 is fed with a control signal CNT from the debug controller 21, and based on the control signal CNT, the selector 27 selectively connects either the first or second input part 27a or 27b to the output part 27c. It is here assumed that the control signal CNT is a one-bit signal that takes either the value "1" or the value "0", and that, when the value of the control signal CNT is "0", the selector 27 is in a CPU selecting state and, when the value of the control signal CNT is "1", the selector 27 is in a debugger selecting state. In the following description, a state in which the selector 27 is in the CPU selecting state is occasionally referred to simply as the "CPU selecting state" and, likewise, a state in which the selector 27 is in the debugger selecting state is occasionally referred to simply as the "debugger selecting state". The "debugger" collectively denotes the parts used in debugging, and should be understood to include all or some of the debug controller 21, the external debugging device 12, and the host PC 13.

In the CPU selecting state, the first input part 27a is connected to the output part 27c, and thus the conductors for transmitting the signals RE1, WE1, ADD1, and WD1 are connected to the data bus 22 via the output part 27c, so that the signals RE1, WE1, ADD1, and WD1 are transmitted to the data bus 22. In the debugger selecting state, the second input part 27b is connected to the output part 27c, and thus the conductors for transmitting the signals RE2, WE2, ADD2, and WD2 are connected to the data bus 22 via the output part 27c, so that the signals RE2, WE2, ADD2, and WD2 are transmitted to the data bus 22.

With attention paid to state control by the selector 27, the control signal CNT can be called a selector control signal. With attention paid to switching of the signals to be fed to the data bus 22, the control signal CNT can be called a data bus control signal or a switching control signal.

The read enable signal, the write enable signal, the address signal, and the write data that are output from the output part 27c in particular are referred to as the read enable signal RE, the write enable signal WE, the address signal ADD, and the write data WD respectively. Write data (WD, WD1, WD2) is data that is output only when a write access, which will be described later, is made.

In the CPU selecting state, the first input part 27a is connected to the output part 27c, and thus the read enable signal RE1, the write enable signal WE1, the address signal ADD1, and the write data WD1 from the CPU 20 are output from the output part 27c to the data bus 22 as the read enable signal RE, the write enable signal WE, the address signal ADD, and the write data WD. In the debugger selecting state, the second input part 27b is connected to the output part 27c, and thus the read enable signal RE2, the write enable signal WE2, the address signal ADD2, and the write data WD2 from the debug controller 21 are output from the output part 27c to the data bus 22 as the read enable signal RE, the write enable signal WE, the address signal ADD, and the write data WD.

In this way, the CPU 20 can access the data bus 22 when the selector 27 is in the CPU selecting state, and the debug controller 21 can access the data bus 22 when the selector 27 is in the debugger selecting state. An access to the data bus 22 can be a read access or a write access. A read access and a write access to the data bus 22 can be understood as a read access and a write access to the data memory 30 via the data bus 22. An access to the RAM 24 and the register 26 is either a read access or a write access, but an access to the ROM 23 is limited to a read access.

The data memory 30 (for example, the RAM 24), on receiving a read access from the CPU 20 or the debug controller 21, performs a read operation to output demanded read data RD to the data bus 22 and, on receiving a write access from the CPU 20 or the debug controller 21, performs a write operation to store data corresponding to the write data WE received across the data bus 22. Read data can be understood as a signal that conveys read data, and thus, in the following description, read data RD is occasionally mentioned as a signal RD for convenience's sake.

The data bus 22 is composed of a plurality of conductors for transmitting the signals RE, WE, ADD, RD, and WD (that is, the signals RE, WE, and ADD and data RD and WD) individually. Among the conductors composing the data bus 22, the conductor for transmitting the read data RD is connected to both the CPU 20 and the debug controller 21. Thus, when, in response to a read access, read data RD is output from the data memory 30 to the data bus 22, the CPU 20 and the debug controller 21 can acquire the read data RD.

A read enable signal (RE, RE1, RE2) is a signal for making the data memory 30 perform a read operation (in other words, a signal that specifies whether or not to make the data memory 30 perform a read operation), and is either in an asserted state (valid state) or in a negated state (invalid state). A read enable signal (RE, RE1, RE2) is a one-bit signal that takes either the value "1" or the value "0", and, in a read enable signal, the value "1" corresponds to the asserted state and the value "0" corresponds to the negated state. A read enable signal (RE, RE1, RE2) with the value "1", that is, a read enable signal in the asserted state, is a valid signal and functions as a signal that demands or permits execution of a read operation. A read enable signal (RE, RE1, RE2) with the value "0", that is, a read enable signals in the negated state, is an invalid signal and acts as a signal that does not demand but instead inhibits execution of a read operation. Thus, the data memory 30 performs a read operation only when it receives a read enable signal RE with the value "1" from the CPU 20 or the debug controller 21 across the data bus 22; when the data memory 30 receives a read enable signal RE with the value "0", it does not perform a read operation.

A write enable signal (WE, WE1, WE2) is a signal for making the data memory 30 perform a write operation (in other words, a signal that specifies whether or not to make the data memory 30 perform a write operation), and is either in an asserted state (valid state) or in a negated state (invalid state). A write enable signal (WE, WE1, WE2) is a one-bit signal that takes either the value "1" or the value "0", and, in a write enable signal, the value "1" corresponds to the asserted state and the value "0" corresponds to the negated state. A write enable signal (WE, WE1, WE2) with the value "1", that is, a write enable signal in the asserted state, is a valid signal and functions as a signal that demands or permits execution of a write operation. A write enable signal (WE, WE1, WE2) with the value "0", that is, a write enable signal in the negated state, is an invalid signal and acts as a signal that does not demand but instead inhibits execution of a write operation. Thus, the data memory 30 performs a write operation only when it receives a write enable signal WE with the value "1" from the CPU 20 or the debug controller 21 across the data bus 22; when the data memory 30 receives a write enable signal WE with the value "0", it does not perform a write operation.

An address signal (ADD, ADD1, ADD2) is a signal which specifies the address of one of the storage areas in the data memory 30 and has the number of bits corresponding to the size of the address space defined in the data memory 30. Read data (RD) is data obtained by reading the data stored in a storage area in the data memory 30 from that storage area. Write data (WD, WD1, WD2) is data to be written to a storage area in the data memory 30. Read data and write data can each have any number of bits (for example, eight bits).

The host PC 13 (in other words, the debugging software 14) can issue predetermined commands based on operation on the host PC 13 by a user of the debugging system 10. Issued predetermined commands are transmitted to the debug controller 21 via the external debugging device 12.

Predetermined commands mentioned above includes a read command that instructs the debug controller 21 to make a read access and a write command that instructs the debug controller 21 to make a write access. A read command specifies an access target address. A write command specifies an access target address along with write data. It can be so understood that, when a read command is transmitted from the external debugging device 12 to the debug controller 21, it is transmitted after having added to it a signal that conveys an access target address. Similarly, it can be so understood that, when a write command is transmitted from the external debugging device 12 to the debug controller 21, it is transmitted after having added to it a signal that conveys an access target address along with write data.

An access target address indicates an address in the address space in the data memory 30. The access target address specified in a read command is the address that is the target of a read access by the debug controller 21, and the access target address specified in a write command is the address that is the target of a write access by the debug controller 21. The write data specified in a write command is the data to be written to the access target address.

In principle, the debug controller 21 outputs the control signal CNT with the value "0" to the selector 27 and thereby switches the selector 27 into the CPU selecting state. When the debug controller 21 needs to make a read access or a write access in response to a read command or a write command received, it outputs the control signal CNT with the value "1" to the selector 27, and thereby switches the state of the selector 27 from the CPU selecting state to the debugger selecting state. On completion of the demanded read or write access, the debug controller 21 switches the state of the selector 27 back to the CPU selecting state.

When a read command is issued, the selector 27 is switched to the debugger selecting state with appropriate timing. Then the debug controller 21, in the debugger selecting state, makes a read access with respect to the data bus 22 in accordance with the read command and thereby acquires, as read data RD, the data stored in the storage area at the access target address. The acquired read data RD is transmitted from the debug controller 21 to the external debugging device 12, and is transmitted via the external debugging device 12 to the host PC 13.

When a write command is issued, the selector 27 is switched to the debugger selecting state with appropriate timing. Then the debug controller 21, in the debugger selecting state, makes a write access with respect to the data bus 22 in accordance with the write command and thereby writes the data specified in the write command to the storage area at the access target address.

Of the signals that are output from the CPU 20 to the selector 27, the read enable signal RE1 and the write enable signal WE1 are fed to the debug controller 21. The timing of switching the selector 27 to the debugger selecting state in response to a read command or a write command received is controlled based on the read enable signal RE1 and the write enable signal WE1.

Specifically, the debug controller 21, on receiving a read command or a write command, checks the signals RE1 and WE1. If the signal RE1 or WE1 is in the asserted state ("1"), it means that the CPU 20 is in the middle of accessing the data bus 22; thus the debug controller 21 waits until both the signals RE1 and WE1 turn to the negated state ("0") and then switches the selector 27 to the debugger selecting state and makes an access in accordance with the received command. On the other hand, when a read command or a write command is received, if both the signals RE1 and WE1 are in the negated state ("0"), the debug controller 21, instead of waiting as mentioned above, promptly switches the selector 27 to the debugger selecting state and makes an access in accordance with the received command. Prior to a description of a configuration for achieving this, an additional description will be given of a read access and a read operation as well as a write access and a write operation.

Figure 3A:
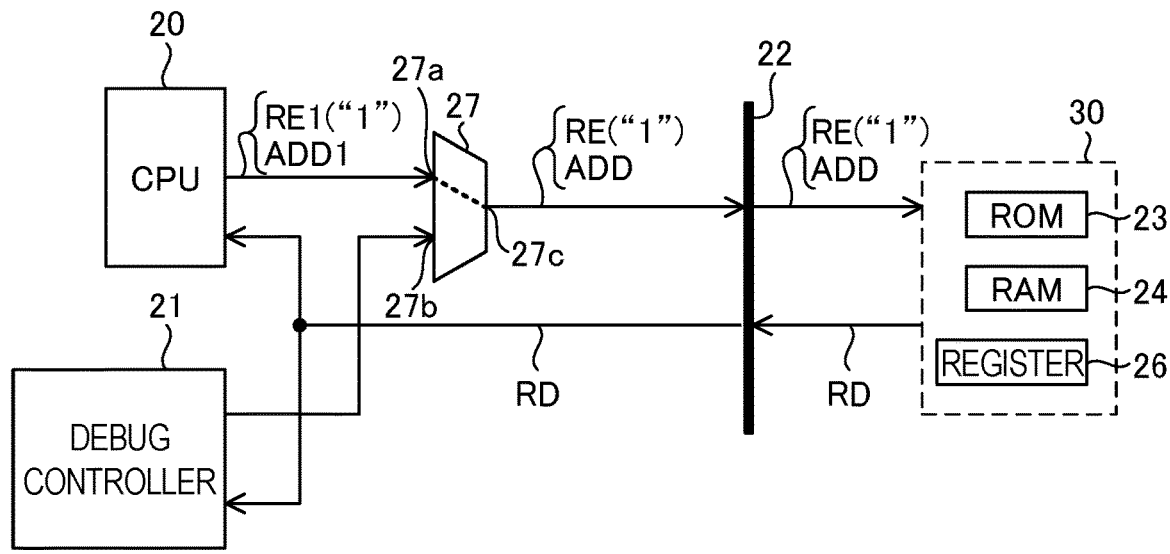
FIGS. 3A and 3B are illustrative diagrams related to the first embodiment of the present disclosure, showing a read access and a read operation.
Figure 3B:
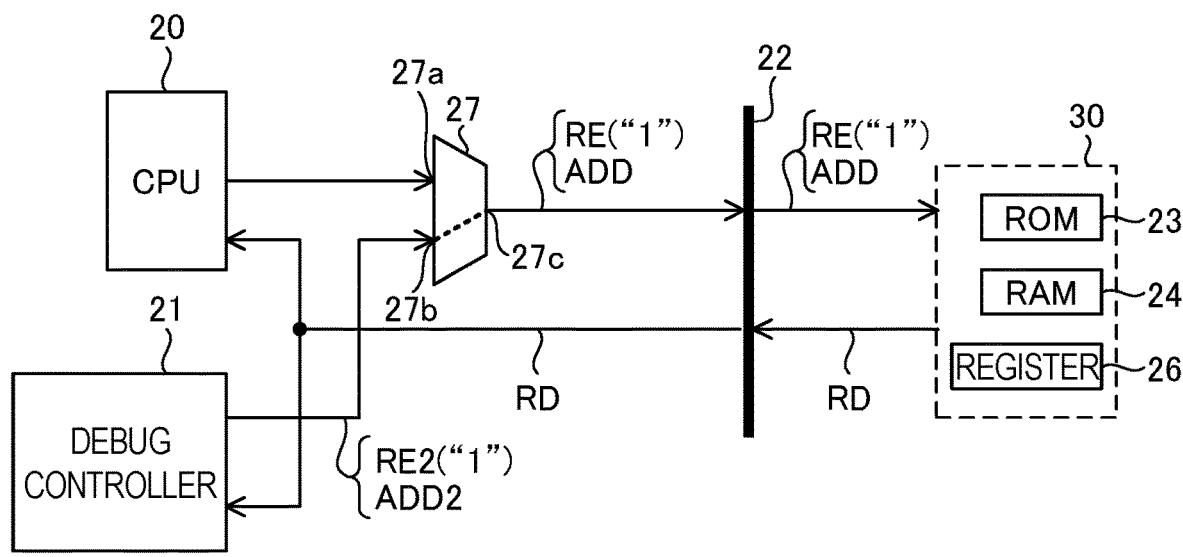

With reference to FIGS. 3A and 3B, an additional description will be given of a read access and a read operation. In the CPU selecting state, the CPU 20 can make a read access based on the program executed by the CPU 20 itself, and, in the debugger selecting state, the debug controller 21 can make a read access based on a read command received.

As shown in FIG. 3A, in a read access in the CPU selecting state, the CPU 20 outputs the read enable signal RE1 with the value "1" and the address signal ADD1 that specifies one of a plurality of addresses defined in the data memory 30, as the read enable signal RE and the address signal ADD, to the data bus 22 via the selector 27, and thereby makes the data memory 30 perform a read operation.

As shown in FIG. 3B, in a read access in the debugger selecting state, the debug controller 21 outputs the read enable signal RE2 with the value "1" and the address signal ADD2 that specifies one of a plurality of addresses defined in the data memory 30, as the read enable signal RE and the address signal ADD, to the data bus 22 via the selector 27, and thereby makes the data memory 30 perform a read operation. The address specified by the address signal ADD2 coincides with the access target address specified in the read command.

In a read operation in response to a read access, the data memory 30 (for example, the RAM 24) reads the data stored in the storage area at the address specified by the address signal ADD fed from the CPU 20 or the debug controller 21 across the data bus 22, and outputs the read data, as read data RD, to the data bus 22. The read data RD that is output to the data bus 22 by the read operation is fed to the CPU 20 and to the debug controller 21 across conductors between the data bus 22 and the CPU 20 and between the data bus 22 and the debug controller 21.

Figure 4A:
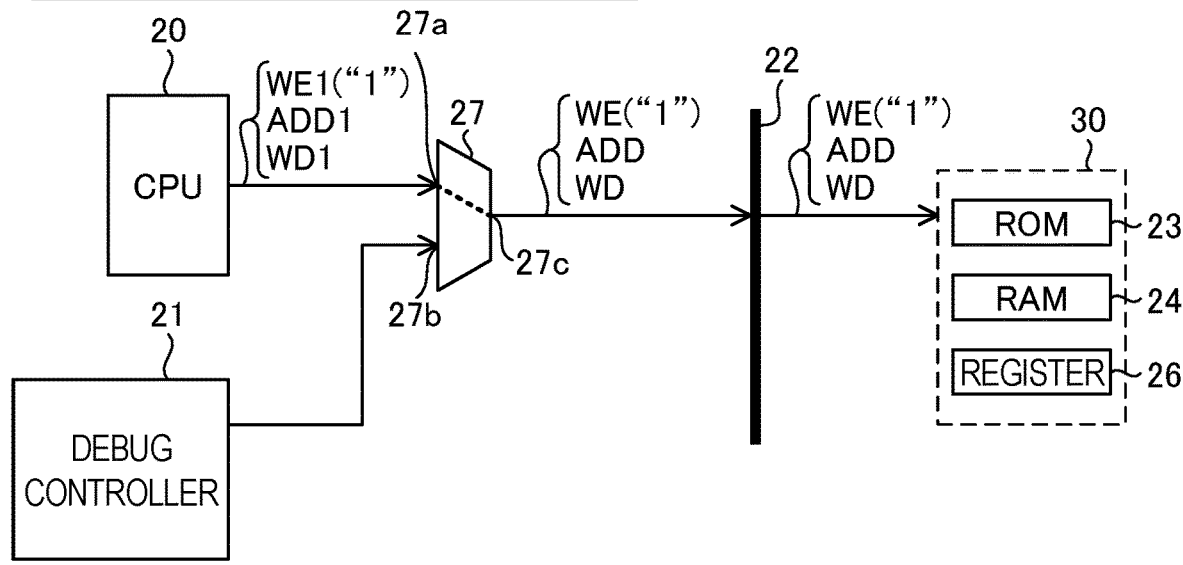
FIGS. 4A and 4B are illustrative diagrams related to the first embodiment of the present disclosure, showing a write access and a write operation.
Figure 4B:
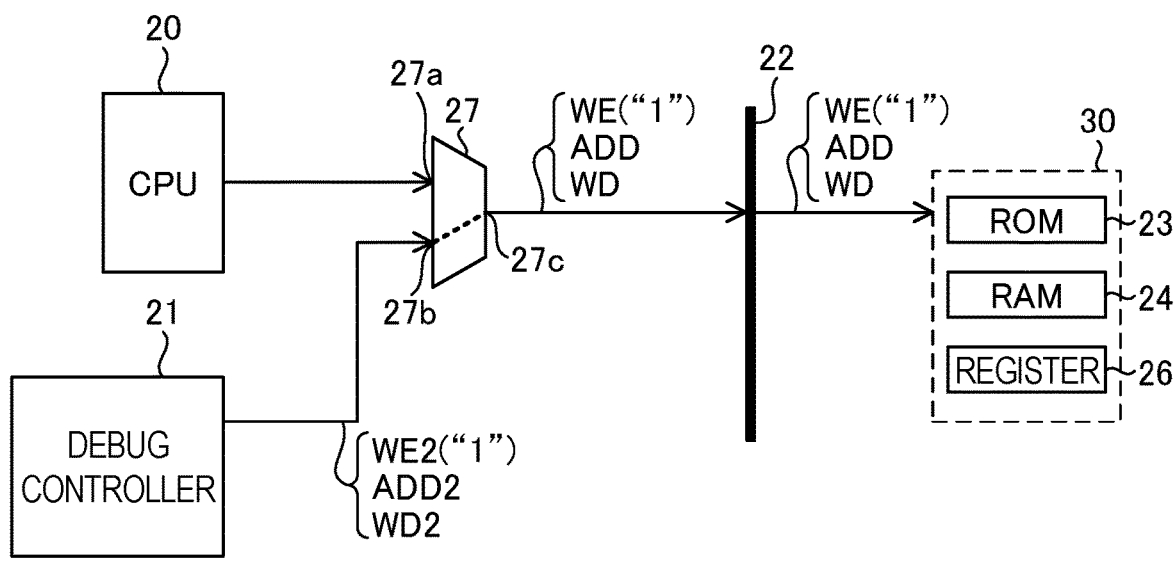

With reference to FIGS. 4A and 4B, an additional description will be given of a write access and a write operation. In the CPU selecting state, the CPU 20 can make a write access based on the program executed by the CPU 20 itself, and, in the debugger selecting state, the debug controller 21 can make a write access based on a write command received.

As shown in FIG. 4A, in a write access in the CPU selecting state, the CPU 20 outputs the write enable signal WE1 with the value "1", the address signal ADD1 that specifies one of a plurality of addresses defined in the data memory 30, and write data WD1 to be written to the storage area at the address specified by the address signal ADD1, as the write enable signal WE, the address signal ADD, and wright data WD, to the data bus 22 via the selector 27, and thereby makes the data memory 30 perform a write operation.

As shown in FIG. 4B, in a write access in the debugger selecting state, the debug controller 21 outputs the write enable signal WE2 with the value "1", the address signal ADD2 that specifies one of a plurality of addresses defined in the data memory 30, and the write data WD2 to be written to the storage area at the address specified by the address signal ADD2, as the write enable signal WE, the address signal ADD, and write data WD, to the data bus 22 via the selector 27, and thereby makes the data memory 30 perform a write operation. The address specified by the address signal ADD2 coincides with the access target address specified in the write command. The write data WD2 coincides with the write data specified in the write command.

In a write operation in response to a write access, the data memory 30 (for example, the RAM 24) stores, in the storage area at the address specified by the address signal ADD fed from the CPU 20 or the debug controller 21 across the data bus 22, data corresponding to the write data WD from the CPU 20 or the debug controller 21. The data stored in the corresponding storage area after the write operation may coincide with the write data WD or, depending on specifications, may not coincide with the write data WD despite being based on write data WD.

Figure 5:
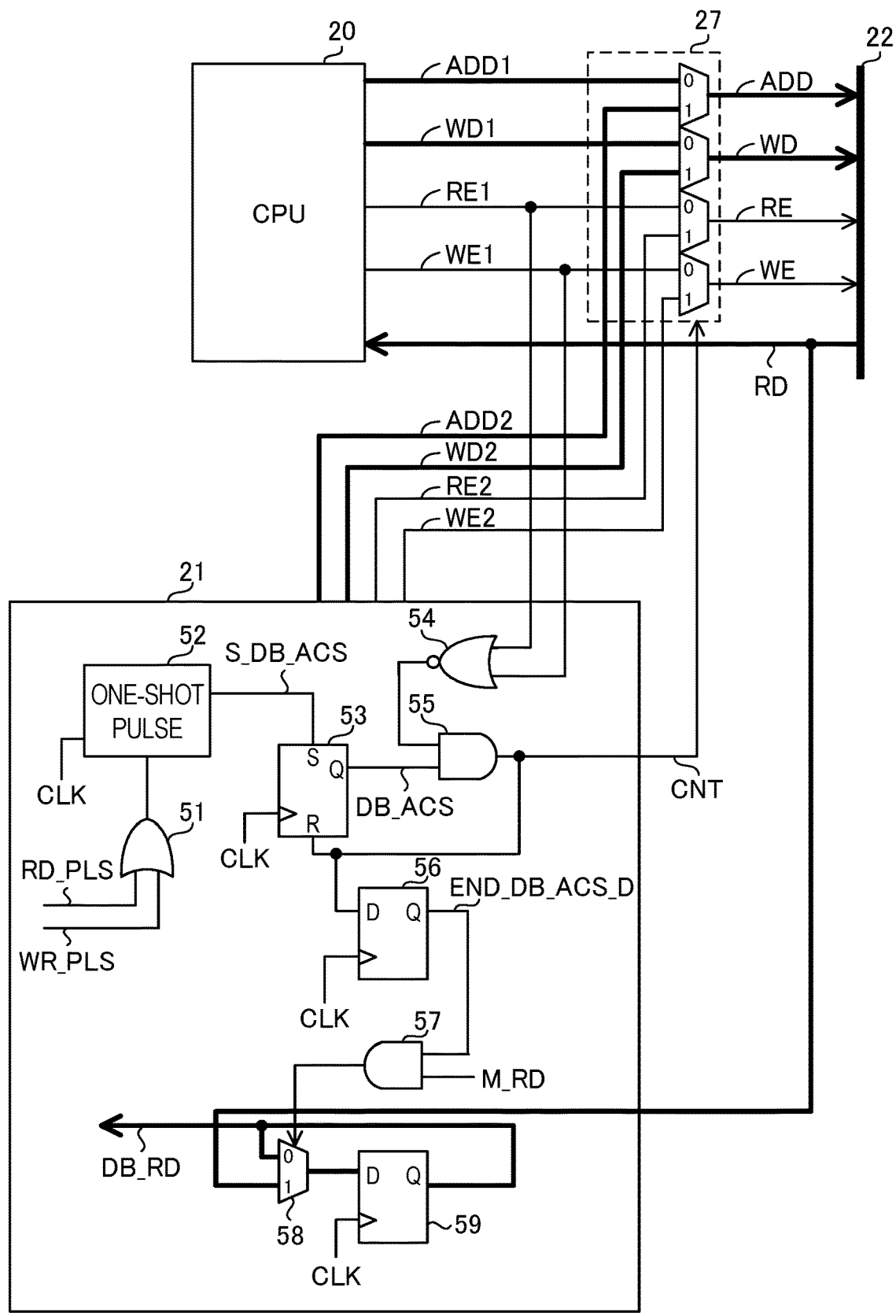
FIG. 5 is a diagram related to the first embodiment of the present disclosure, showing an internal configuration of a debug controller and a configuration around it.

FIG. 5 shows an example of the internal configuration of the debug controller 21 along with the configuration around it. In the following description, a CPU clock denotes an operation clock for the CPU 20. The CPU clock is referred to by the reference sign "CLK". A debugger clock denotes an operation clock for some of the circuit elements of the debug controller 21 and for the external debugging device 12. The rest (including FFs 53 and 56 and a latch circuit 59 described later) of the circuit elements of the debug controller 21 operate in synchronization with the operation clock for the CPU 20. The debugger clock is generated, for example, in a clock generation circuit (not shown) within the external debugging device 12 and is fed to the debug controller 21 across a communication line between the external debugging device 12 and the debug controller 21. The CPU clock and the debugger clock are asynchronous with respect to each other. The CPU clock and the debugger clock may or may not have equal frequencies. Generally, the debugger clock has a lower frequency than the CPU clock.

Any clock, including the debugger clock and the CPU clock, is a signal with a rectangular waveform that alternates between high and low levels periodically. With any clock or signal, high level is higher in potential than low level. With any signal, a change from low level to high level will be called an up edge, and the timing of a change from low level to high level will be called an up edge timing. With any signal, a change from high level to low level will be called a down edge, and the timing of a change from high level to low level will be called a down edge timing.

The debug controller 21 in FIG. 5 comprises a digital circuit including an OR circuit 51, a one-shot pulse circuit 52, a FF 53, an OR circuit 54, an AND circuit 55, a FF 56, an AND circuit 57, a selector 58, and a latch circuit 59. The input and output signals to and from the circuit elements of the digital circuit and the signals that are handled by the circuit elements of the digital circuit are binary signals that take as their signal levels low level or high level. First, a description will be given of the respective circuit elements in terms of the input and output signals to and from them and their basic operation.

The OR circuit 51 receives a read request signal RD_PLS and a write request signal WR_PLS and outputs the OR signal of the signals RD_PLS and WR_PLS. The signals RD_PLS and WR_PLS are signals synchronous with the debugger clock. The signal RD_PLS is in principle at low level but, when a read command is received, it turns to and remains at high level for one clock cycle (that is, one period) of the debugger clock. The signal WR_PLS is in principle at low level but, when a write command is received, it turns to and remains at high level for one clock cycle of the debugger clock. Thus, when the debug controller 21 receives a read command or a write command, a signal that turns to and remains at high level only for a length of time corresponding to one clock cycle of the debugger clock is output from the OR circuit 51.

The one-shot pulse circuit 52 outputs as a data bus access start signal S_DB_ACS a one-shot pulse signal which results from synchronizing the output signal of the OR circuit 51 with the CPU clock. The signal S_DB_ACS is in principle at low level. Owing to the function of the circuits 51 and 52, when a read command or a write command is received, after a predetermined delay, the signal S_DB_ACS turns to and remains at high level for one clock cycle (that is, one period) of the CPU clock.

The FF 53 is an RS flip-flop that operates in synchronization with the CPU clock. The FF 53 has a clock input terminal for receiving the CPU clock, a data output terminal (Q terminal), and, as synchronous input terminals, a set terminal (S terminal) and a reset terminal (R terminal). The FF 53 receives, at the set terminal, the data bus access start signal S_DB_ACS and, at the reset terminal, the control signal CNT, and outputs, from the data output terminal, a data bus access signal DB_ACS.

The data bus access signal DB_ACS is a signal that indicates permission of access to the data bus 22 by the debug controller 21. The signal DB_ACS is, at high level, in an asserted state and, at low level, in a negated state. That is, the signal DB_ACS at high level is a valid signal that indicates permission of access to the data bus 22 by the debug controller 21, and the signal DB_ACS at low level is an invalid signal that does not indicate permission of access to the data bus 22 by the debug controller 21.

At an up edge timing of the CPU clock, if the signal S_DB_ACS is at high level, the FF 53 turns the signal DB_ACS to high level. After the signal DB_ACS is turned to high level, it is kept at high level until the input signal to the reset terminal of the FF 53 turns to high level.

At an up edge timing of the CPU clock, if the control signal CNT is at high level, the FF 53 turns the signal DB_ACS to low level. After the signal DB_ACS is turned to low level, it is kept at low level until the input signal to the set terminal of the FF 53 turns to high level.

The OR circuit 54 is connected to a conductor for transmitting the read enable signal RE1 and to a conductor for transmitting the write enable signal WE1, of which both conductors are provided between the CPU 20 and the selector 27. The OR circuit 54 receives as input signals the signals RE1 and WE1 and outputs the inversion signal of the OR signal of the signals RE1 and WE1. In both the signals RE1 and WE1, the value "0" (that is, the negated state) is assigned low level, and the value "1" (that is, the asserted state) is assigned high level. Thus, the OR circuit 54 outputs a high-level signal only when the signals RE1 and WE1 are both at low level ("0") and otherwise outputs a low-level signal.

The AND circuit 55 outputs as the control signal CNT an AND signal of the data bus access signal DB_ACS from the FF 53 and an output signal from the OR circuit 54. Only when the data bus access signal DB_ACS is at high level (in the asserted state) and in addition the read enable signal RE1 and the write enable signal WE1 from the CPU 20 are both at low level (in the negated state), the control signal CNT is at high level, and otherwise the control signal CNT is at high level. In the signal CNT, the value "0" is assigned low level, and the value "1" is assigned low level. Thus, the selector 27 is, when the control signal CNT is at low level, in the CPU selecting state and, when the control signal CNT is at high level, in the debugger selecting state. The control signal CNT that is output from the AND circuit 55 is fed to the reset terminal of the FF 53 and also to the data input terminal of the FF 56.

The FF 56 is a D flip-flop that operates in synchronization with the CPU clock. The FF 56 includes a clock input terminal for receiving the CPU clock, a data input terminal (D terminal), and a data output terminal (Q terminal). The FF 56 acquires and holds the input signal (CNT) fed to its data input terminal in synchronization with an up edge in the CPU clock, and outputs the held signal from its data output terminal. The output signal from the FF 56 is referred to as a data bus access end signal and is referred to by the reference sign "END_DB_ACS_D". The data bus access end signal END_DB_ACS_D is a signal that results from delaying the control signal CNT by one clock cycle of the CPU clock.

The AND circuit 57 outputs the AND signal of the data bus access end signal END_DB_ACS_D from the FF 56 and a mode signal M_RD fed from an unillustrated circuit. Thus, only when the signals END_DB_ACS and M_RD are both at high level, the output signal of the AND circuit 57 is at high level, and otherwise it is at low level. When, in response to a read command received, a read access is made by the debug controller 21, the mode signal M_RD is at high level and otherwise the mode signal M_RD is at low level.

The selector 58 includes a first input terminal, a second input terminal, and an output terminal. When the output signal from the AND circuit 57 is at low level, the selector 58 outputs the data fed to its first input terminal from its output terminal; when the output signal from the AND circuit 57 is at high level, the selector 58 outputs the data fed to its second input terminal from its output terminal. The first input terminal of the selector 58 is fed with the output data from the latch circuit 59. The second input terminal of the selector 58 is connected to the conductor for transmitting read data RD in the data bus 22. Thus, when read data RD is output from the data memory 30 to the data bus 22, the read data RD is fed to the second input terminal of the selector 58.

The latch circuit 59 includes a clock input terminal for receiving the CPU clock, a data input terminal (D terminal) connected to the output terminal of the selector 58, and a data output terminal (Q terminal) connected to the first input terminal of the selector 58. The latch circuit 59 is composed of as many D flip-flops as the number of bits in read data RD. In synchronization with an up edge in the CPU clock, the latch circuit 59 latches (acquires and holds) the data from the output terminal of the selector 58 and the latch circuit 59 outputs the latched data from its data output terminal. The output data from the data output terminal of the latch circuit 59 is called debugger read data and is referred to by the reference sign "DB_RD".

The latching, triggered by the output signal from the AND circuit 57 turning to high level, of read data RD by the latch circuit 59 is maintained, through coordinated operation of the selector 58 and the latch circuit 59 as described above, until, after the output signal from the AND circuit 57 turns to low level, the output signal from the AND circuit 57 turns to high level next time.

A description will be given of a procedure of operation related to reception of a read command or a write command. So long as no read command or write command is received, the signals S_DB_ACS and DB_ACS are kept at low level, and the selector 27 is in a CPU selecting state, and only the CPU 20 can access the data bus 22.

When the debug controller 21 receives a read command or a write command, the data bus access start signal S_DB_ACS turns to high level and thereby starting of access to the data bus 22 by the debug controller 21 is requested. This request is transmitted as the data bus access signal DB_ACS at high level to the AND circuit 55.

On the other hand, when the debug controller 21 receives a read command, a signal for a read access is output from the debug controller 21 to the selector 27. The signal for a read access is composed of the address signal ADD2 corresponding to the read command and the read enable signal RE2 with the value "1". Here, the address specified by the address signal ADD2 coincides with the access target address specified in the read command. The output of the signal for a read access to the selector 27 starts when, or before, an up edge occurs in the signal DB_ACS and ends when the read access in response to the read command is complete.

In contrast, when the debug controller 21 receives a write command, a signal for a write access is output from the debug controller 21 to the selector 27. The signal for a write access is composed of the address signal ADD2 with write data WD2 corresponding to the write command and the write enable signal WE2 with the value "1". Here, the address specified by the address signal ADD2 coincides with the access target address specified in the write command. The write data WD2 coincides with the write data specified in the write command. The output of the signal for a write access to the selector 27 starts when, or before, an up edge occurs in the signal DB_ACS and ends when the write access in response to the write command is complete.

Even when the data bus access signal DB_ACS is at high level, if either the read enable signal RE1 or the write enable signal WE1 from the CPU 20 is at high level, it means that the CPU 20 is making an access of some kind to the data bus 22. Thus, the CPU selecting state is maintained so as not to interfere with the access by the CPU 20, while an actual access by the debug controller 21 is put on standby.

When the data bus access signal DB_ACS is at high level, if the read enable signal RE1 and the write enable signal WE1 from the CPU 20 are both at low level, it means that the CPU 20 is making no access to the data bus 22. Thus, the control signal CNT at high level is output from the AND circuit 55, so that the selector 27 is switched to the debugger selecting state, and a desired access (a read access or a write access) by the debug controller 21 is made. Here the desired access is achieved, when a read command is received, by outputting the signal (ADD2, RE2) for the read access to the data bus 22 via the selector 27 and, when a write command is received, by outputting the signal (ADD2, WD2, WE2) for the write access to the data bus 22 via the selector 27.

When the control signal CNT is turned to high level, owing to the function of the FF 53, the signal DB_ACS is cleared (that is, the signal DB_ACS is switched to low level) at the next up edge in the CPU clock. At this point, the desired access (read access or write access) by the debug controller 21 has been complete.

When the debug controller 21 makes a read access, at a time delayed from the read access by one clock cycle of the CPU clock, read data RD corresponding to the read access appears on the data bus 22. Thus, using a signal (END_DB_ACS_D) that results from delaying the control signal CNT by one clock cycle, the read data RD is latched by the latch circuit 59. The latched read data RD is transmitted as debugger read data DB_RD from the debug controller 21 to the external debugging device 12, and is transmitted via the external debugging device 12 to the host PC 13.

A configuration is also possible where, asynchronously with the CPU clock, read data RD is output to the data bus 22 when, along with the write enable signal RE with the value "1", the address signal ADD is input to the data bus 22. In this case, it is not necessary to generate a signal (END_DB_ACS_D) that results from delaying the control signal CNT, and read data RD can be latched by the latch circuit 59 at a time when the control signal CNT is at high level.

In this way, the debug controller 21 is configured to control the state of the selector 27 based on the reception state of a predetermined command (a read command or a write command) from the external debugging device 12 as well as the states of the read enable signal RE1 and the write enable signal WE1 from the CPU 20 so that, when the selector 27 is in the debugger selecting state, the debug controller 21 accesses the data bus 22 via the selector 27.

In this way, it is possible to build, with a compact configuration, a debugging system that can access the data bus 22 without affecting program execution by the CPU 20 in any way.

Specifically, when the debug controller 21 accesses the data bus 22 in response to a predetermined command received, if the signal RE1 or WE1 is in the asserted state (at high level), it waits until the signals RE1 and WE1 both turn to the negated state (low level), and then switches the selector 27 to the debugger selecting state and makes an access to the data bus 22 in accordance with the predetermined command. That is, the debug controller 21 goes on standby to wait until the signals RE1 and WE1 both turn to the negated states and, when the signals RE1 and WE1 both turn to the negated state, the debug controller 21 switches the selector 27 to the debugger selecting state and makes an access to the data bus 22 in accordance with the predetermined command.

When the debug controller 21 accesses the data bus 22 in response to a predetermined command received, if the signals RE1 and WE1 are both in the negated state, instead of waiting as described above (without going on standby), it immediately turns the selector 27 to the debugger selecting state and makes an access to the data bus 22 in accordance with the predetermined command.

More specifically, the debug controller 21 has circuits (51, 52, 53) for generating a data bus access signal DB_ACS that indicates permission of access to the data bus 22 by the debug controller 21. In response to a predetermined command received, the data bus access signal DB_ACS is turned from the negated state (low level) to the asserted state (high level).

When the data bus access signal DB_ACS is turned from the negated state to the asserted state, if the signal RE1 or WE1 from the CPU 20 is in the asserted state (at high level), the debug controller 21 waits until the signals RE1 and WE1 both turn to the negated state (low level), and then switches the selector 27 to the debugger selecting state to make an access to the data bus 22 in accordance with the predetermined command. That is, the debug controller 21 goes on standby to wait until the signals RE1 and WE1 both turn to the negated states and, when the signals RE1 and WE1 both turn to the negated state, the debug controller 21 switches the selector 27 to the debugger selecting state to make an access to the data bus 22 in accordance with the predetermined command.

On the other hand, when the data bus access signal DB_ACS is turned from the negated state (low level) to the asserted state (high level), if the signals RE1 and WE1 are both in the negated state, the debug controller 21, without waiting as described above (without going on standby), immediately switches the selector 27 to the debugger selecting state to make an access to the data bus 22 in accordance with the predetermined command.

Based on the above configuration, when the data bus access signal DB_ACS is in the negated state (at low level), the debug controller 21 switches the selector 27 to the CPU selecting state. Then, after turning the data bus access signal DB_ACS from the negated state (low level) to the asserted state (high level) in response to a predetermined command, the debug controller 21 switches the selector 27 to the debugger selecting state to make an access to the data bus 22 in accordance with the predetermined command, and then turns the data bus access signal DB_ACS from the asserted state (high level) back to the negated state (low level) and thereby switches the selector 27 back to the CPU selecting state.

In this way, the selector 27 is basically in the CPU selecting state, and only when the debug controller 21 needs to access the data bus 22, the selector 27 switches to the debugger selecting state without interfering with the operation of the CPU 20. That is, the operation of the CPU 20 is not affected in any way.

As will be understood from the above description, when a read command is received, the debug controller 21, in the debugger selecting state, outputs a signal for a read access to make, via the selector 27, a read access to the data bus 22 in accordance with the read command (in other words, it makes a read access to the data memory 30 in accordance with the read command via the selector 27 and the data bus 22). More specifically, in the read access, the debug controller 21 makes, via the selector 27, an access to the data bus 22 for acquiring from the data memory 30, as read data RD, the data in the storage area at the address (access target address) specified in the read command (in other words, it makes an access to the data memory 30 via the selector 27 and the data bus 22), and transmits the thus acquired read data RD to the external debugging device 12.

On the other hand, when a write command is received, the debug controller 21, in the debugger selecting state, outputs a signal for a write access and makes, via the selector 27, a write access to the data bus 22 in accordance with the write command (in other words, it makes a write access to the data memory 30 in accordance with the write command via the selector 27 and the data bus 22). More specifically, in a write access, the debug controller 21 makes, via the selector 27, an access to the data bus 22 for writing the write data specified in the write command to the storage area at the address (access target address) specified in the write command (in other words, it makes an access to the data memory 30 via the selector 27 and the data bus 22).

[Timing Chart]

Figure 6:
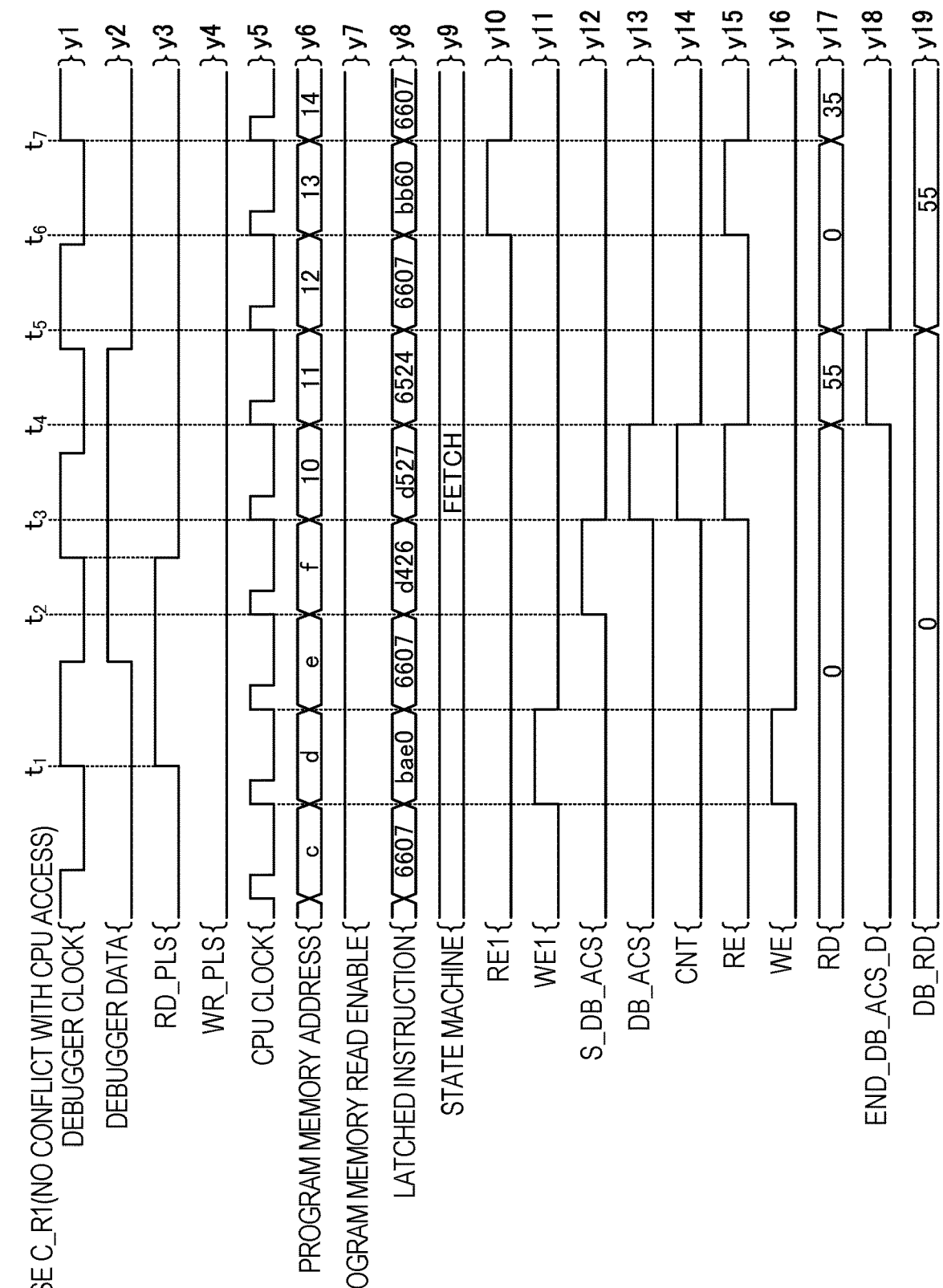
FIG. 6 is a diagram related to the first embodiment of the present disclosure, showing one example of a timing chart showing how the LSI responds to a read command received.
Figure 7:
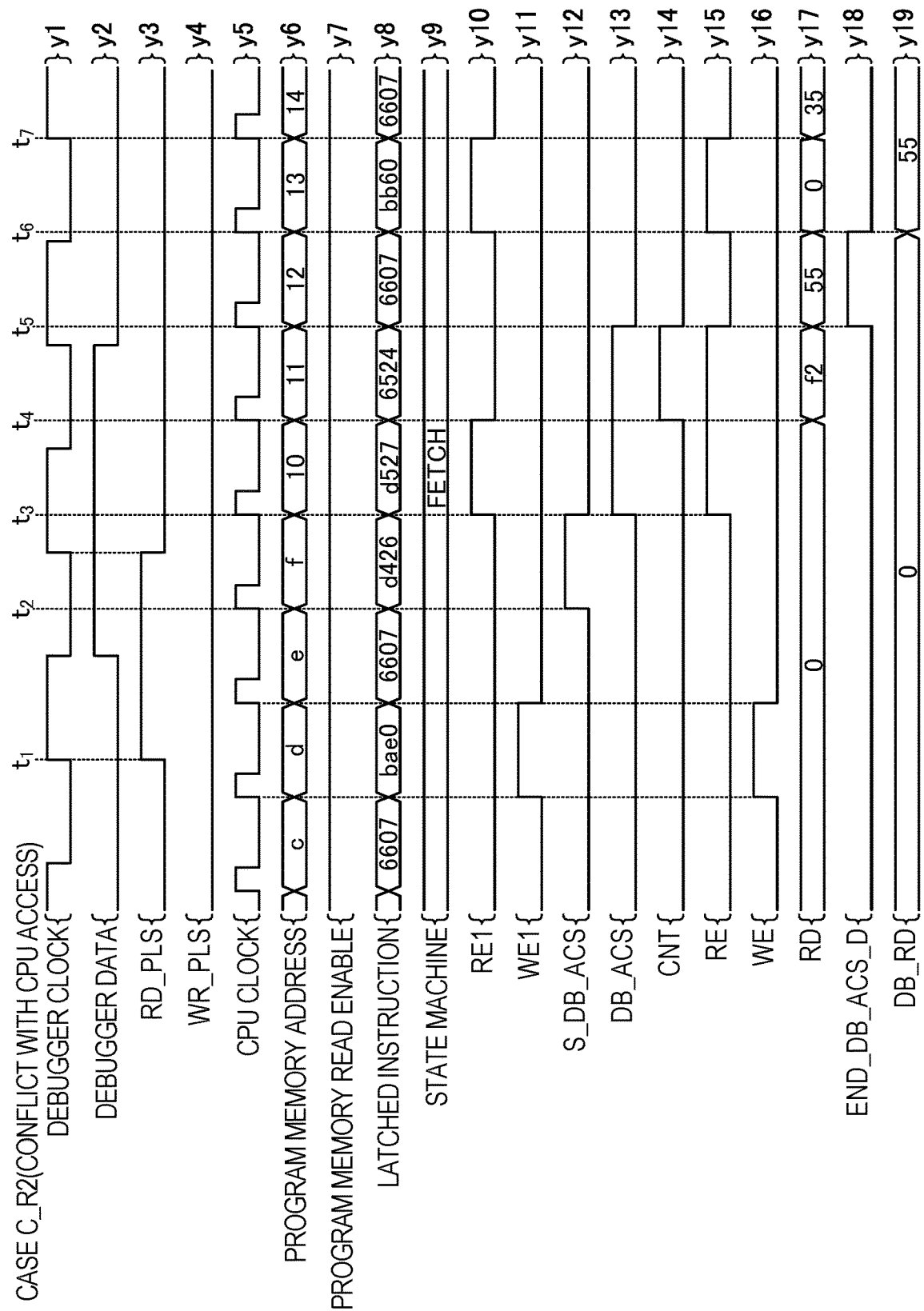
FIG. 7 is a diagram related to the first embodiment of the present disclosure, showing another example of a timing chart showing how the LSI responds to a read command received.

FIGS. 6 and 7 are timing charts showing how the LSI 11 responds to a read command received, and FIGS. 8 and 9 are timing charts showing how the LSI 11 responds to a write command received. FIGS. 6, 7, 8, and 9 are timing charts depicting cases C_R1, C_R2, C_W1, and C_W2 respectively.

Case C_R1 in FIG. 6 is a case where a read access attempted by the debug controller 21 causes no conflict with an access by the CPU 20.

Case C_R2 in FIG. 7 is a case where a read access attempted by the debug controller 21 causes a conflict with an access by the CPU 20.

Case C_W1 in FIG. 8 is a case where a write access attempted by the debug controller 21 causes no conflict with an access by the CPU 20.

Case C_W2 in FIG. 9 is a case where a write access attempted by the debug controller 21 causes a conflict with an access by the CPU 20.

Waveforms y1 to y19 shown in FIGS. 6 to 9 are the same waveforms across FIGS. 6 to 9, though the details of each waveform partly vary among FIGS. 6 to 9. First, what each waveform indicates will be described.

Waveform y1 is the waveform of the debugger clock, and waveform y5 is the waveform of the CPU clock. As mentioned above, part of the debug controller 21 operates in synchronization with the debugger clock, and, in response to an up edge in the debugger clock, it acquires input signals to itself, changes the levels of the signals to be output, or changes its own state. The rest of the debug controller 21 and the CPU 20 operate in synchronization with the CPU clock, and, in response to an up edge of the CPU clock, they acquire input signals to them, change the levels of the signals to be output, or change their own states. As time passes, time points (timing) $t_1$, $t_2$, $t_3$, $t_4$, $t_5$, $t_6$, and $t_7$ come in this order. Time point $t_1$ is an up edge timing in the debugger clock. At each of time points $t_2$, $t_3$, $t_4$, $t_5$, $t_6$, and $t_7$, an up edge occurs in the CPU clock. The lengths of time between time points $t_2$ and $t_3$, between time points $t_3$ and $t_4$, between time points $t_4$ and $t_5$, between time points $t_5$ and $t_6$, and between time points $t_6$ and $t_7$ all equal one period of the CPU clock.

Waveform y2 indicates debugger data and is a schematic representation of the signal transmitted from the external debugging device 12 to the debug controller 21. Debugger data includes data constituting a read command or a write command.

Waveform y3 is the waveform of the read request signal RD_PLS based on a read command, and Waveform y4 is the waveform of the write request signal WR_PLS based on a write command (see also FIG. 5).

The CPU 20 includes a program counter that counts and specifies the address on the program memory 29 (hereinafter called the program memory address) at which an instruction to be fetched next is stored, and, only when a program memory read enable signal is at high level is the program memory address updated sequentially, using the program counter, in synchronization with the CPU clock, at the period of the CPU clock. In FIGS. 6 to 9, "y6" indicates the change with time of the program memory address, and "y7" indicates the program memory read enable signal. Throughout the time span covered in FIGS. 6 to 9, the program memory read enable signal is kept at high level.

An operation in which a needed instruction is read and acquired from the program memory 29 is called a fetch. Of different states of program execution by the CPU 20, a state in which an instruction included in the program is fetched and executed is called a fetch state. In the fetch state, the CPU 20 fetches and latches the instruction indicated by the program memory address. In FIGS. 6 to 9, "y8" indicates the change with time of the instructions (instruction code) latched by fetches, and "y9" indicates the change with time of the state of a state machine. The state machine is composed of a register provided in the CPU 20 and controls program execution by the CPU 20. Throughout the time span covered in FIGS. 6 to 9, the CPU 20 is kept in the fetch state.

In FIGS. 6 to 9, waveforms y10 and y11 are respectively the waveforms of the read enable signal RE1 and the write enable signal WE1 from the CPU 20. In FIGS. 6 to 9, waveforms y12, y13, y14, and y18 are respectively the waveforms of the data bus access start signal S_DB_ACS, the data bus access signal DB_ACS, the control signal CNT, and the data bus access end signal END_DB_ACS_D, all in the debug controller 21. In FIGS. 6 to 9, waveforms y15 and y16 are respectively the waveforms of the read enable signal RE and the write enable signal WE on the data bus 22. Further, "y17" indicates read data RD that appears on the data bus 22, and "y19" indicates debugger read data DB_RD that is latched by the latch circuit 59 (see FIG. 5). In waveforms "y17" and "y19", when data RD or data DB_RD has no significant value, it is indicated as "0".

—Case C_R1—

The operation in Case C_R1 in FIG. 6 will be described. In Case C_R1, based on a read command received, starting at time point $t_1$, a pulse occurs in the read request signal RD_PLS (at time point $t_1$, an up edge occurs in the read request signal RD_PLS). As a result of the pulse in the read request signal RD_PLS being synchronized with the CPU clock, a pulse occurs in the data bus access start signal S_DB_ACS. That is, the signal S_DB_ACS is at high level between time points $t_2$ and $t_3$. Then, owing to the function of the FF 53 in FIG. 5, at time point $t_3$, an up edge occurs in the data bus access signal DB_ACS.

In Case C_R1 in FIG. 6, the CPU 20 does not make an access to the data bus 22 during the clock period between time points $t_3$ and $t_4$ (that is, the signals RE1 and WE1 are both at low level). Thus, at time pint $t_3$, an up edge occurs also in the control signal CNT. When an up edge occurs in the control signal CNT, owing to the function of the FF 53, at the next up edge timing $t_4$ of the CPU clock, a down edge occurs in the data bus access signal DB_ACS and in the control signal CNT.

As mentioned above, the output of the signal for a read access from the debug controller 21 to the selector 27 takes place at the same time as, or before, an up edge occurs in the signal DB_ACS. Thus, during the period in which the control signal CNT is at high level (that is, between time points $t_3$ ad $t_4$), the signal RE2 with the value "1" included in the signal for a read access from the debug controller 21 (that is, the signal RE2 at high level) appears as the signal RE on the data bus 22.

During the next clock period between time points $t_4$ and $t_5$, read data RD that is output from the data memory 30 based on the signal for a read access from the debug controller 21 appears on the data bus 22, and, owing to the function of the FF 56, the signal END_DB_ACS_D is at high level. As a result, the read data RD that has appeared on the data bus 22 between time points $t_4$ and $t_5$ is, in response to an up edge in the CPU clock at time point $t_5$, latched as the debugger read data DB_RD by the latch circuit 59.

—Case C_R2—

The operation in Case C_R2 in FIG. 7 will be described. In Case C_R2 in FIG. 7, the operation up to the occurrence of an up edge in the data bus access signal DB_ACS at time point $t_3$ is similar to that in Case C_R1 in FIG. 6.

In Case C_R2 in FIG. 7, the CPU 20 makes a read access to the data bus 22 during the clock period between time points $t_3$ and $t_4$ (that is, the signal RE1 is at high level). Thus, although the data bus access signal DB_ACS is at high level between time points $t_3$ and $t_4$, the control signal CNT is kept at low level. The high-level signal RE between time points $t_3$ and $t_4$ is based on the high-level signal RE1 from the CPU 20.

Then, in Case C_R2 in FIG. 7, the CPU 20 does not make an access to the data bus 22 during the clock period between time points $t_4$ and $t_5$ (that is, the signals RE1 and WE1 are both at low level). Thus, at time pint $t_4$, an up edge occurs in the control signal CNT. When an up edge occurs in the control signal CNT, owing to the function of the FF 53, at the next up edge timing $t_5$ of the CPU clock, a down edge occurs in the data bus access signal DB_ACS and in the control signal CNT. During the period in which the control signal CNT is at high level (that is, between time points $t_4$ ad $t_5$), the signal RE2 with the value "1" included in the signal for a read access from the debug controller 21 (that is, the signal RE2 at high level) appears as the signal RE on the data bus 22.

During the next clock period between time points $t_5$ and $t_6$, read data RD that is output from the data memory 30 based on the signal for a read access from the debug controller 21 appears on the data bus 22, and, owing to the function of the FF 56, the signal END_DB_ACS_D is at high level. As a result, the read data RD that has appeared on the data bus 22 between time points $t_5$ and $t_6$ is, in response to an up edge of the CPU clock at time point $t_6$, latched as the debugger read data DB_RD by the latch circuit 59.

In Case C_R2 in FIG. 7, the period between time points $t_3$ and $t_4$ corresponds to a period in which the debug controller 21 waits until the signals RE1 and WE1 both turn to the negated state ("0"). The length of the wait is for one period of the CPU clock in the example in FIG. 7, but it may last for a plurality of periods of the CPU clock. The cause of the wait is the high-level signal RE1 in the example in FIG. 7, but it can instead be the high-level signal WE1.

In either of Case C_R1 in FIG. 6 and Case C_R2 in FIG. 7, it is not necessary to stop program execution by the CPU 20, and the fetch state is maintained, including while the debug controller 21 is in the middle of making an access to the data bus 22, so that instructions are sequentially executed. Transmission of the debugger read data DB_RD to the external debugging device 12 is performed concurrently with, without affecting, program execution by the CPU 20.

—Case C_W1—

The operation in Case C_W1 in FIG. 8 will be described. In Case C_W1, based on a write command received, starting at time point $t_1$, a pulse occurs in the write request signal WR_PLS (an up edge occurs in the write request signal WR_PLS at time point $t_1$). As a result of the pulse in the write request signal WR_PLS being synchronized with the CPU clock, a pulse occurs in the data bus access start signal S_DB_ACS. That is, the signal S_DB_ACS is at high level between time points $t_2$ and $t_3$. Then, owing to the function of the FF 53 in FIG. 5, at time point $t_3$, an up edge occurs in the data bus access signal DB_ACS.

In Case C_W1 in FIG. 8, the CPU 20 does not make an access to the data bus 22 during the clock period between time points $t_3$ and $t_4$ (that is, the signals RE1 and WE1 are both at low level). Thus, at time pint $t_3$, an up edge occurs also in the control signal CNT. When an up edge occurs in the control signal CNT, owing to the function of the FF 53, at the next up edge timing $t_4$ of the CPU clock, a down edge occurs in the data bus access signal DB_ACS and in the control signal CNT.

As described above, the output of the signal for a write access from the debug controller 21 to the selector 27 takes place at the same time as, or before, an up edge occurs in the signal DB_ACS. Thus, during the period in which the control signal CNT is at high level (that is, between time points $t_3$ and $t_4$), the signal WE2 with the value "1" included in the signal for a write access from the debug controller 21 (that is, the signal WE2 at high level) appears as the signal WE on the data bus 22, and thus, in this period, a write access by the debug controller 21 is made based on a write command.

During the next clock period between time points $t_4$ and $t_5$, owing to the function of the FF 56, the signal END_DB_ACS_D is at high level, but when a write access is made, the signal END_DB_ACS_D has no significance.

—Case C_W2—

The operation in Case C_W2 in FIG. 9 will be described. In Case C_W2 in FIG. 9, the operation up to the occurrence of an up edge in the data bus access signal DB_ACS at time point $t_3$ is similar to that in Case C_W1 in FIG. 8.

In Case C_W2 in FIG. 9, the CPU 20 makes a read access to the data bus 22 during the clock period between time points $t_3$ and $t_4$ (that is, the signal RE1 is at high level). Thus, although the data bus access signal DB_ACS is at high level between time points $t_3$ and $t_4$, the control signal CNT is kept at low level. The high-level signal RE between time points $t_3$ and $t_4$ is based on the high-level signal RE1 from the CPU 20.

Then, in Case C_W2 in FIG. 9, the CPU 20 does not make an access to the data bus 22 during the clock period between time points $t_4$ and $t_5$ (that is, the signals RE1 and WE1 are both at low level). Thus, at time pint $t_4$, an up edge occurs in the control signal CNT. When an up edge occurs in the control signal CNT, owing to the function of the FF 53, at the next up edge timing $t_5$ of the CPU clock, a down edge occurs in the data bus access signal DB_ACS and in the control signal CNT. During the period in which the control signal CNT is at high level (that is, between time points $t_4$ ad $t_5$), the signal WE2 with the value "1" included in the signal for a write access from the debug controller 21 (that is, the signal WE2 at high level) appears as the signal WE on the data bus 22, and thus, in this period, a write access by the debug controller 21 is made based on a write command.

During the next clock period between time points $t_5$ and $t_6$, owing to the function of the FF 56, the signal END_DB_ACS_D is at high level, but when a write access is made, the signal END_DB_ACS_D has no significance.

In Case C_W2 in FIG. 9, the period between time points $t_3$ and $t_4$ corresponds to a period for which the debug controller 21 waits until the signals RE1 and WE1 both turn to the negated state ("0"). The length of the wait is for one period of the CPU clock in the example in FIG. 9, but it may last for a plurality of periods of the CPU clock. The cause of the wait is the high-level signal RE1 in the example in FIG. 9, but it can instead be the high-level signal WE1.

In either of Case C_W1 in FIG. 8 and Case C_W2 in FIG. 9, it is not necessary to stop program execution by the CPU 20, and the fetch state is maintained, including while the debug controller 21 is in the middle of making an access to the data bus 22, so that instructions are sequentially executed.

Second Embodiment

A second embodiment of the present disclosure will be described. As the second embodiment, a description will be given of some applied techniques, modified techniques, and so forth which can be applied to the first embodiment described above. The second embodiment includes Examples EX2_1 to EX2_5 described below.

Example EX2_1

Example EX2_1 will be described. The LSI 11 may include two or more CPUs 20 that access the data bus 22. In this case, the LSI 11 also includes an arbitration circuit (not shown) for preventing the two or more CPUs 20 from accessing the data bus 22 simultaneously. Owing to the function of the arbitration circuit, one of the two or more CPUs 20 is given permission to access the data bus 22, and only the output signal and output data from that one of the two or more CPUs 20 which is given permission to access are transmitted to the data bus 22.

When control as in the first embodiment is applied to such a configuration, it can be understood that the CPU 20 that is given permission to access feeds the signals RE1, WE1, ADD1, and WD1 to the selector 27.

Example 2-2

The Example EX2_2 will be described. In the configuration in FIG. 1, the CPU 20 is an example of a processor that accesses the data bus 22. In the present disclosure, such a processor is not limited to a CPU, and any circuit that accesses the data bus 22 can be a processor. As in Example EX2_1, when two or more CPUs 20 are included in the LSI 11, it can be understood that the two or more CPUs 20 and an arbitration circuit constitute the processor, or that the CPU 20 that is given permission to access serves as the processor.

Example EX2_3

Example EX2_3 will be described. Without departure from the spirit of what has been described above, for any signal, the relationship between high level and low level may be the other way around. In this connection, for any signal, whichever of positive logic and negative logic can be adopted.

Example EX2_4

Example EX2_4 will be described. The circuit elements that constitute the LSI 11 are produced in the form of a semiconductor integrated circuit, and, by sealing the semiconductor integrated circuit in a casing (package) formed of resin, a semiconductor device is built. Here, a circuit equivalent to the circuit in the LSI 11 may be built using a plurality of discrete components.

Example EX2_5

Example EX2_5 will be described. A debug system according to the present disclosure includes a semiconductor device as exemplified by the LSI 11 and an external device connected to the semiconductor device. Here, in the configuration in FIG. 1, the external device may be understood to denote the external debugging device 12 or to include both the external debugging device 12 and the host PC 13.

Embodiments of the present disclosure can be implemented with various modifications made within the spirit of their technical ingenuity defined in the appended claims. It should be understood that the embodiments described above are merely examples of how the present disclosure can be implemented, and thus the senses of the terms used to describe the present disclosure and its constituent elements are not limited in any way to those in which they are used in the above description of embodiments. The specific values mentioned in the above description are meant merely as examples, and they may be modified to different values.

LIST OF REFERENCE SIGNS 10 debugging system
11 LSI
12 external debugging device
13 host computer
14 debugging software
20 CPU
21 debug controller
22 data bus
23 ROM
24 RAM
25 peripheral
26 register
27 selector
28 program bus
29 program memory
30 data memory

The invention claimed is:

1. A semiconductor device comprising:
a data bus;
a data memory configured to be connected to the data bus;
a selector configured to be connected to the data bus;
a processor configured to execute a program and to be able to access the data bus via the selector; and
a debug controller configured to be able to communicate with an external device bidirectionally and to be able to access the data bus via the selector,
wherein
the selector is configured to be controlled by the debug controller to be in either
a first selecting state in which the processor transmits, out of a first signal from the processor and a second signal from the debug controller, the first signal to the data bus, and
a second selecting state in which the debug controller transmits, out of the first signal from the processor and the second signal from the debug controller, the second signal to the data bus,
signals output from the processor to the selector include
a read enable signal for making the data memory perform a read operation, and
a write enable signal for making the data memory perform a write operation, and
the debug controller is configured to control a state of the selector based on a reception state of a predetermined command from the external device as well as states of the read enable signal and the write enable signal from the processor such that, when the selector is in the second selecting state, the debug controller accesses the data bus via the selector.

2. The semiconductor device according to claim 1, wherein the debug controller is configured such that,
when accessing the data bus in response to the predetermined command received, if the read enable signal or the write enable signal is in an asserted state, the debug controller waits until the read enable signal and the write enable signal both turn to a negated state and then switches the selector to the second selecting state to make an access to the data bus in accordance with the predetermined command, and
when accessing the data bus in response to the predetermined command received, if the read enable signal and the write enable signal are both in the negated state, the debug controller, without waiting, switches the selector to the second selecting state to make an access to the data bus in accordance with the predetermined command.

3. The semiconductor device according to claim 2, wherein
the debug controller has a circuit for generating a data bus access signal that indicates permission of access to the data bus by the debug controller,
in response to the predetermined command received, the data bus access signal is turned from the negated state to the asserted state, and
the debug controller is configured such that,
when the data bus access signal is turned from the negated state to the asserted state, if the read enable signal or the write enable signal is in the asserted state, the debug controller waits until the read enable signal and the write enable signal both turn to the negated state and then switches the selector to the second selecting state to make an access to the data bus in accordance with the predetermined command, and
when the data bus access signal is turned from the negated state to the asserted state, if the read enable signal and the write enable signal are both in the negated state, the debug controller, without waiting, switches the selector to the second selecting state to make an access to the data bus in accordance with the predetermined command.

4. The semiconductor device according to claim 3, wherein
the debug controller is configured such that,
when the data bus access signal is in the negated state, the debug controller keeps the selector in the first selecting state, and
after turning the data bus access signal from the negated state to the asserted state in response to the predetermined command received, the debug controller switches the selector to the second selecting state to make an access to the data bus in accordance with the predetermined command, and then turns the data bus access signal from the asserted state back to the negated state and thereby switches the selector back to the first selecting state.

5. The semiconductor device according to claim 1, wherein the debug controller is configured such that,
before the predetermined command is received, the debug controller keeps the selector in the first selecting state, and
after the predetermined command is received, the debug controller switches the selector from the first selecting state to the second selecting state to make an access to the data bus in accordance with the predetermined command, and then switches the selector back to the first selecting state.

6. The semiconductor device according to claim 1, wherein the debug controller is configured such that, on receiving a read command as the predetermined command, the debug controller makes a read access to the data bus in accordance with the read command when the selector is in the second selecting state, and the debug controller then transmits, to the external device, read data acquired from the data memory by the read access.

7. The semiconductor device according to claim 6, wherein the data memory has a plurality of storage areas to which a plurality of addresses are assigned, the read command specifies one of the plurality of addresses, and the debug controller is configured such that, in the read access in accordance with the read command, the debug controller makes, via the selector, an access to the data bus to acquire from the data memory, as the read data, data in a storage area at an address specified in the read command and transmits the thus acquired read data to the external device.

8. The semiconductor device according to claim 1, wherein the debug controller is configured such that, when a write command is received as the predetermined command, the debug controller makes a write access to the data bus in accordance with the write command when the selector is in the second selecting state, and by the write access, data is written to the data memory in accordance with the write command.

9. The semiconductor device according to claim 8, wherein the data memory has a plurality of storage areas to which a plurality of addresses are assigned, the write command specifies one of the plurality of addresses along with write data, and the debug controller is configured such that, in the write access in accordance with the write command, the debug controller makes, via the selector, an access to the data bus to write the write data to a storage area at an address specified in the write command.

10. A debugging system comprising:

a semiconductor device according to claim 1; and an external device configured to be connected to the semiconductor device and to be able to transmit the predetermined command to the debug controller in the semiconductor device.

* * * * *